US006050393A

United States Patent [19]

Murai et al.

[11] Patent Number: 6,050,393

[45] Date of Patent: Apr. 18, 2000

[54] DRIVE APPARATUS FOR DRIVING AN OSCILLATOR AND A POWDER FEEDER HAVING THE DRIVE APPARATUS THEREIN

[75] Inventors: Katsumi Murai; Mamoru Tateishi, both of Obu, Japan

[73] Assignee: Aisan Kogyo Kabushiki Kaisha, Japan

[21] Appl. No.: 08/941,343

[22] Filed: Sep. 30, 1997

[30] Foreign Application Priority Data

Oct. 14, 1996 [JP] Japan .................................... 8-270539

[51] Int. Cl.[7] ..................................................... B65G 47/19

[52] U.S. Cl. .......................... 198/533; 198/751; 318/128; 318/129; 331/DIG. 2

[58] Field of Search ..................................... 198/533, 751, 198/766; 331/DIG. 2; 318/128, 129, 116

[56] References Cited

U.S. PATENT DOCUMENTS

| | | | |
|---|---|---|---|
| 3,216,557 | 11/1965 | Morris et al. | 198/751 |
| 4,331,263 | 5/1982 | Brown | 318/128 |
| 4,395,665 | 7/1983 | Buchas | 198/751 |
| 5,477,099 | 12/1995 | Suganuma | 318/116 |
| 5,942,926 | 8/1999 | Yamaguchi | 331/DIG. 2 |

*Primary Examiner*—Christopher P. Ellis
*Assistant Examiner*—Mark A. Deuble
*Attorney, Agent, or Firm*—Finnegan, Henderson, Farabow, Garrett & Dunner, L.L.P.

[57] ABSTRACT

Disclosed is the drive apparatus for the powder feeder, which has; the duty ratio control circuit 12 which applies the alternating voltage with the resonance frequency to the vibrator 10 during a time corresponding to the duty ratio; the current monitor 15 which detects the residual frequency of the electro motive force produced due to the residual oscillation of the vibrator 10 when the alternating voltage with the resonance frequency is not applied from the duty ratio control circuit 12 and feeds back the detected residual frequency to the PLL control circuit 11 through the zero-cross comparator 17.

16 Claims, 13 Drawing Sheets

DRIVE APPARATUS FOR DRIVING AN OSCILLATOR AND A POWDER FEEDER HAVING THE DRIVE APPARATUS THEREIN

BACKGROUND OF THE INVENTION

1. Field of the Invention

The present invention relates to a drive apparatus for driving an oscillator with a resonance frequency and a powder feeder having the drive apparatus therein. In particular, the present invention relates to a drive apparatus for driving an oscillator with a resonance frequency, in which Phase Lock Loop (PLL) control is conducted to follow the resonance frequency given to the oscillator with an actual resonance frequency when the resonance frequency of the oscillator having the resonance frequency actually changes, and relates to a powder feeder in which the drive apparatus is installed.

2. Description of Related Art

In a case of controlling an oscillator with a resonance frequency in the resonance region (resonance point), it is conventionally popularized a control method for controlling a driving voltage given to the oscillator. For example, it is shown in FIG. 10 a driving voltage control circuit for driving an ultrasonic motor. In this control circuit, a peak value of the driving voltage is controlled in a DC-DC converter.

Operation of the above control circuit will be shown in FIG. 12 by indicating a relationship with the driving voltage supplied to the ultrasonic motor.

On the other hand, in case of driving the oscillator with the resonance frequency in the resonance region (resonance point ) to continuously drive it as in the method by the driving voltage control circuit, it is difficult to precisely control the output such as vibration amplitude of the oscillator in the resonance point by the driving force (for example, the driving voltage ). Further, there is a problem that feedback cannot be done in a narrow control region.

Thus, it is proposed a control method to intermittently apply the driving force to the oscillator and control it. For instance, there is a control method that a driving voltage is applied intermittently to control the operation time per one cycle (duty ratio) namely the time average output. Such control is performed, for example, using a circuit shown in the block diagram of FIG. 11.

As a motor capable of such controlling, for example, an ultrasonic motor using an ultrasonic resonator is known. In the ultrasonic motor, the mechanical deformation of a piezoelectric element caused by electric energy is used to generate mechanical vibration of a vibrator and the output of the ultrasonic motor is changed by changing the duty ratio of the driving voltage.

For instance, an ultrasonic resonator which generates both axial vibration (longitudinal vibration) and bending vibration generates elliptic oscillation at a top end thereof with the resonance frequency. A pipe is attached to the top end of the resonator, and powder is fed in the pipe, then the powder is moved in the certain direction, this mechanism can therefore be used as a powder feeder. In this case, also an AC driving voltage with the resonance frequency is applied to the resonator intermittently to control the feed amount of the powder. The driving voltage controlled by the duty ratio is shown in FIG. 13.

In some cases, driving force having resonance frequency is applied intermittently in order to obtain pulse vibration. In the case of a fish detector for investigating topography of sea floor or fish by transmitting ultrasonic waves into water and by detecting reflected echos, a driving voltage of a resonance frequency is applied intermittently into water to transmit ultrasonic waves into water. On the other hand, after the transmission of ultrasonic waves the vibration is stopped, and an echo is received from water and thus the fish detector serves as a sensor for catching the information in water.

Similar examples include an ultrasonic wave sensor for detecting the existence of some objects in air by emitting ultrasonic waves into water and detecting reflected ultrasonic waves from an object and an ultrasonic range finder for measuring the distance by measuring reflection time of the ultrasonic waves.

On the contrary, there will be a case that the resonance frequency of the vibrator, for example, in the powder feeder, changes on the basis of change in weight of the powder while feeding thereof. In cases that the resonance frequency of the vibrator actually changes, it is widely used a Phase Lock Loop (PLL) control circuit as a control circuit to follow the resonance frequency of the vibrator with the actual resonance frequency. A general PLL control circuit is shown in FIG. 4. Operation of the PLL control circuit is shown in FIG. 5.

The PLL control circuit has a feedback loop utilized for extracting (demodulating) a base band signal from a frequency-modulated carrier wave. The PLL control circuit is constructed from a phase comparator 101, a loop filter 102 and a voltage control oscillator 103, as shown in FIG. 4. In the PLL control circuit, a phase of the input signal and a phase of output signal from the voltage control oscillator 103 are mutually compared in the phase comparator 101, and the output from the phase comparator 101 is input to the loop filter 102. Further, based on the output from the loop filter 102, the frequency of the voltage control oscillator 103 is controlled.

That is, if the frequency of the input signal and the frequency of the voltage control oscillator 103 are different, a beat signal corresponding to difference between the frequencies of the input signal and the voltage control oscillator 103 is produced as the output signal of the phase comparator 101. In FIG. 5, if the output signal lies in a range of synchronism in the PLL control circuit, the frequency of the voltage control oscillator 103 approaches to the frequency of the input signal in the positive half-period, and goes away from the frequency of the input signal in the negative half-period. Based on this, the DC component changes more slowly in the positive half-period than in the negative half-period, and the level of DC component becomes totally positive. The voltage control oscillator 103 is controlled so that the difference between the frequencies becomes smaller by the DC voltage. Both the frequencies of the input signal and the voltage control oscillator 103 completely synchronize when the response of the PLL control circuit can follow with the wave of the beat signal.

However, there exist the following problems in the above conventional drive apparatus for the oscillator. In the voltage control method, if the peak value of the driving voltage becomes low, it becomes difficult to detect the current in the phase comparator 101 of the PLL control circuit. Further, the PLL control circuit is opened when correct voltage is not applied to the vibrator, such as the ultrasonic motor. The resonance frequency of the vibrator therefore cannot follow with the actual resonance frequency when the resonance frequency of the vibrator actually changes.

Also, in the duty ratio control method, the PLL control circuit is opened in an inactive period of the duty ratio, and the resonance frequency of the vibrator cannot follow with the actual resonance frequency when the resonance frequency actually changes. In particular, this problem becomes remarkable when the duty ratio is small. Here, signal waves in the circuit shown in FIG. 11 are shown in FIG. 14. FIG. 14(*a*) shows an output signal from the duty ratio control circuit, FIG. 14(*b*) shows an output signal from the drive circuit, and FIG. 14(*c*) shows an output signal after waveform shaping. After waveform shaping, the output signal for the pulse corresponding to a period during which vibration is not given to the vibrator by the duty ratio control circuit vanishes. Therefore, feedback is not conducted in the PLL control circuit and the PLL control circuit is opened. As a result, the PLL control circuit does not operate when the resonance frequency of the vibrator actually changes.

Further, in the resonators of the fish detector or the ultrasonic range finder, there remains a problem that the time difference measurement between the emitted and reflected ultrasonic waves is erroneously conducted when the frequency of ultrasonic waves is fluctuated.

SUMMARY OF THE INVENTION

Accordingly, it is an object of the present invention to overcome the above mentioned problems and to provide a drive apparatus for driving an oscillator with a resonance frequency, in which PLL control can be correctly conducted so that the resonance frequency applied to the oscillator follows with the actual resonance frequency thereof while controlling the vibrator under the duty ratio control, when the resonance frequency actually changes. Another object of the present invention is to provide a powder feeder in which such drive apparatus is installed.

To accomplish the above objects, the present invention provides a drive apparatus for driving a vibrator by applying an alternating voltage with a resonance frequency to the vibrator, the drive apparatus comprising:

Phase Lock Loop (PLL) control means for following the resonance frequency with an actual resonance frequency when the resonance frequency actually changes;

- duty ratio control means for applying the alternating voltage with the resonance frequency to the vibrator according to a duty ratio; and
- feedback means for detecting a residual frequency of an electromotive force produced due to a residual oscillation of the vibrator when the alternating voltage with the resonance frequency is not applied to the vibrator and for feeding back the detected residual frequency to the PLL control means.

Further, the present invention provides a powder feeder comprising:

- a vibrator having a top end which oscillates with elliptic motion when an alternating voltage with a resonance frequency is applied;
- a powder feed path attached to the top end of the vibrator;
- a powder storing hopper for storing and feeding the powder to the powder feed path;
- duty ratio control means for applying the alternating voltage with the resonance frequency to the vibrator according to a duty ratio;

Phase Lock Loop (PLL) control means for following the resonance frequency with an actual resonance frequency when the resonance frequency actually changes; and

- feedback means for detecting a residual frequency of an electromotive force produced due to a residual oscillation of the vibrator when the alternating voltage with the resonance frequency is not applied to the vibrator and for feeding back the detected residual frequency to the PLL control means.

In the control apparatus, the duty ratio control means applies the alternating voltage with the resonance frequency to the vibrator for a time according to the duty ratio. Thereby, the vibrator oscillates with the resonance frequency. When the alternating voltage is not applied, the vibrator slightly oscillates with the residual oscillation due to the electromotive force produced in the vibrator.

On the other hand, there will be a case that the resonance frequency actually changes on the basis of outside influence such as load change occurring in the vibrator. To correspond to this case, the PLL control means exists in the drive apparatus so that the resonance frequency applied to the vibrator can automatically follow with the actual resonance frequency. The PLL control means has a loop construction and operates rapidly and correctly so as to respond to a slight deviation between the resonance frequency and the actual resonance frequency.

However, in the conventional apparatus, when the vibrator does not oscillate under control by the duty ratio control means, feedback control cannot be done, thus control by the PLL control means stops. Thereafter, such control by the PLL control means starts again after the alternating voltage starts to be applied to the vibrator by the duty ratio control means. Therefore, the PLL control means cannot efficiently operate. As a result, there remains a problem that oscillation of the vibrator becomes weak when the resonance frequency of the vibrator actually changes in the drive apparatus having the duty ratio control means and the PLL control means. Also, it remains a problem that the loop of the PLL control means is opened and oscillation of the vibrator becomes weak out of the resonance frequency, even if the resonance frequency does not actually change.

On the contrary, in the drive apparatus according to the invention, the feedback means detects the load current produced due to the electromotive force occurring on the basis of the residual oscillation in the vibrator, and converts the load current into a voltage. Further, the feedback means converts the voltage into the phase information and the oscillating frequency information, and feeds back such information to the PLL control means. In this way, since the frequency of the residual oscillation is used as a feedback signal, the PLL control means can operate when the alternating voltage is not applied to the vibrator by the duty ratio control means. Therefore, the resonance frequency applied to the vibrator can rapidly and correctly follow with the actual resonance frequency, when the resonance frequency of the vibrator actually changes.

Here, the vibrator having a resonance frequency driven with the resonance frequency intermittently may be a vibrator which converts electric and magnetic energy to mechanical energy using a piezoelectric element, electrostrictive element, or magnetostrictive element. Using such elements can easily realize mechanical deformation by applying voltage.

Examples of the vibrator having a piezoelctric element include fish detection vibrators used for hydroacoustic generation of a fish detector, air ultrasonic vibrators used for ultrasonic range finders and ultrasonic sensors, ultrasonic vibrators used for fusing, processing, and cutting of plastics, and ultrasonic motors.

In the powder feeder of the present invention, the top end of the vibrator oscillates with elliptic motion, thus the powder feed path attached to the top end also oscillates with elliptic motion. Then, the powder fed to the powder feed path from the powder storing hopper receives acceleration in the horizontal direction (in the direction perpendicular to the longitudinal vibration of the vibrator and in the direction parallel to the bending vibration direction of the vibrator) and is moved. Thus, the powder is fed. By installing the drive apparatus in the powder feeder, control by the PLL control means can continue when the alternating voltage is not applied to the vibrator under control by the duty ratio control means. Therefore, feed amount of the powder can be controlled with high accuracy.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The invention will be described with reference to the accompanying drawings, wherein.

DETAILED DESCRIPTION OF THE PREFERRED EMBODIMENTS

Figure 6:
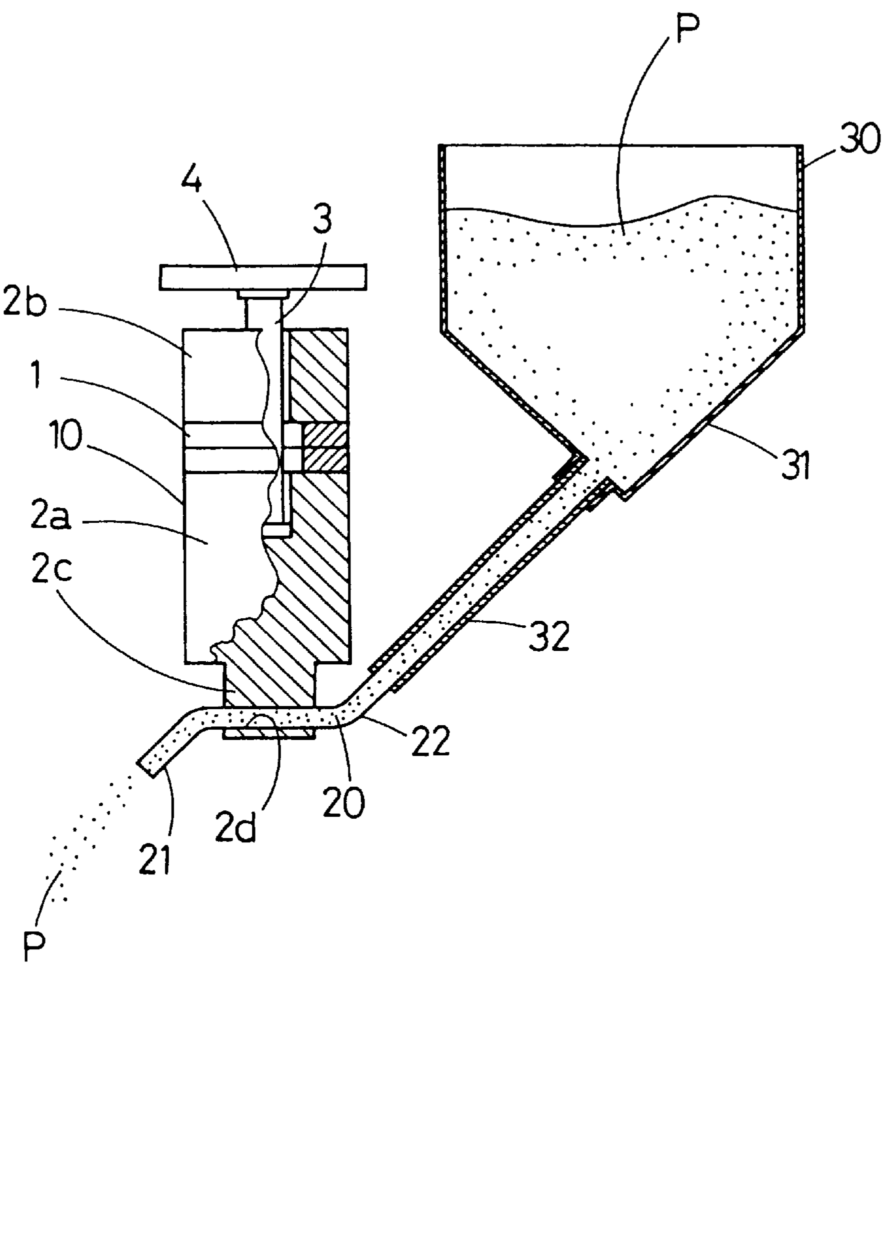
FIG. 6 is a partially sectional view which schematically shows the powder feeder.

A detailed description of the embodiment embodying the present invention will be given referring to the accompanying drawings. The structure of a powder feeder according to the embodiment is shown in FIG. 6. FIG. 6 schematically shows the structure of the powder feeder.

The vibrator 10 is a so-called linear type ultrasonic motor, two flat ring piezoelectric elements 1 are stacked with interposition of an electrode not shown in the figure, and placed between an approximately cylindrical metal horn 2*a* and an approximately hollow cylindrical metal back horn 2*b*. The vibrator 10 is fixed to a fixing member 4 with a bolt 3, which is fastened to the horn 2*a* at the one end, inserted through a through hole which extends through the back horn 2*b* and piezoelectric element 1 at the center.

The end 2*c* of the horn 2*a* is double flatted and provided with a through hole 2*d* for being inserted with a pipe as described hereinafter.

A powder feed pipe 20, in the inner part of which the powder circulates, is inserted and fixed to the through hole 2*d*. The end 21 of the powder feed pipe 20 locating in the left side of the figure is bent slightly downward to help powder P fed from the right side in the figure to drop from the end 21 of the pipe 20.

On the other hand, the other end 22 of the pipe 20 in the right side of the figure is bent slightly upward to help the powder P fed from a hopper body 30 to move to the left side in the figure.

The hopper body 30 is provided for storing the powder P and feeding slowly the powder P to the pipe 20, the bottom 31 has a funnel configuration. A tube 32 is connected to the bottom 31, and the other end of the tube 32 is connected to the end 22 of the powder feed pipe 20. Accordingly, the powder P charged in the hopper body 30 is fed to the pipe 20 through the tube 32. The tube 32 made of flexible material is selected so as not to suppress the vibration of the vibrator 10. In this embodiment a nylon tube is used.

Figure 7:
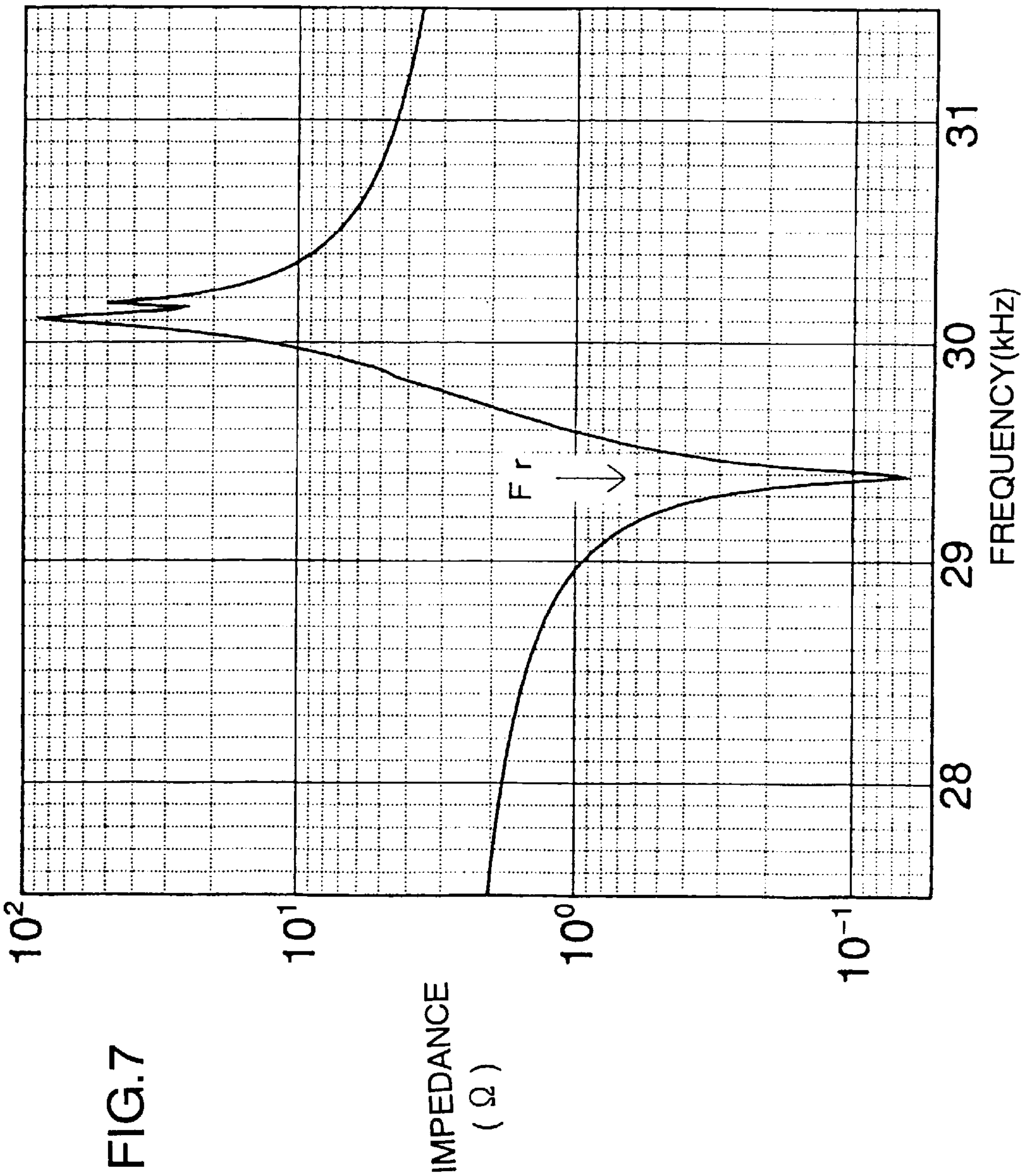
FIG. 7 is a graph which shows frequency characteristic of input impedance of a vibrator.

FIG. 7 shows the result of measurement of the input impedance frequency characteristics of the vibrator 10 measured by means of an impedance analyzer. From this result, it is obvious that the resonance frequency Fr of the vibrator 10 is about 29.4 kHz. Driving with this resonance frequency Fr generates large vibration. On the other hand, driving with a frequency different from the resonance frequency, namely non-resonance frequency, generates little vibration because driving energy can not enter due to high impedance. Thus, in the embodiment, driving of the vibrator 10 is switched ON/OFF by alternately applying the resonance frequency and the non-resonance frequency. Here, the vibrator 10 can be switched ON/OFF even in a case that the driving voltage is not applied to the vibrator 10 in the period during which the non-resonance frequency is applied.

The vibration is described for the case that the vibrator 10 is vibrated with the resonance frequency.

Figure 8:
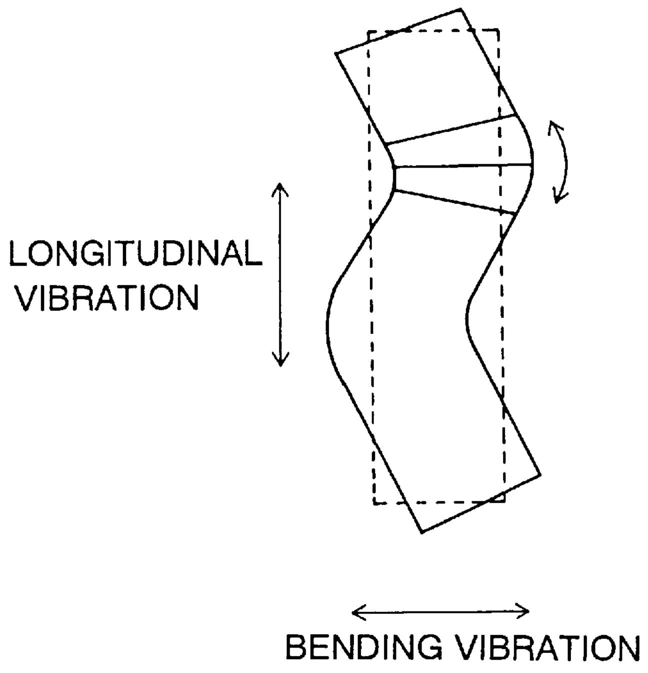
FIG. 8 is a schematic view of the vibrator which shows vibration states when driven with the resonance frequency.

The vibration of the piezoelectric element 1 with the resonance frequency causes the extension-shrinking deformation of the piezoelectric element 1, and the vibrator 10 is bending-vibrated as shown in FIG. 8. This bending vibration is a resultant motion of the extension shrinking motion in the vertical direction in the figure (longitudinal vibration) and bending vibration in the horizontal direction in the figure (flexing vibration).

Figures 9A, 9B, 9C, 9D:
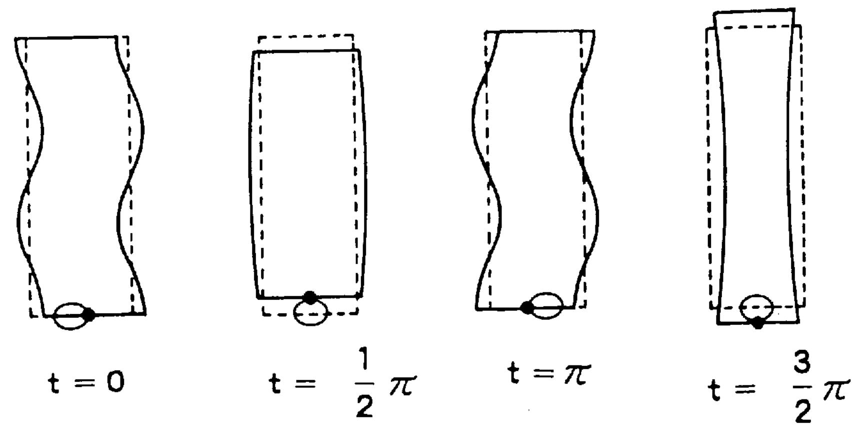
FIGS. 9*a*–9*d* are schematic views of the vibrator which shows vibration states every ¼ cycle when driven with the resonance frequency.
Figure 10:
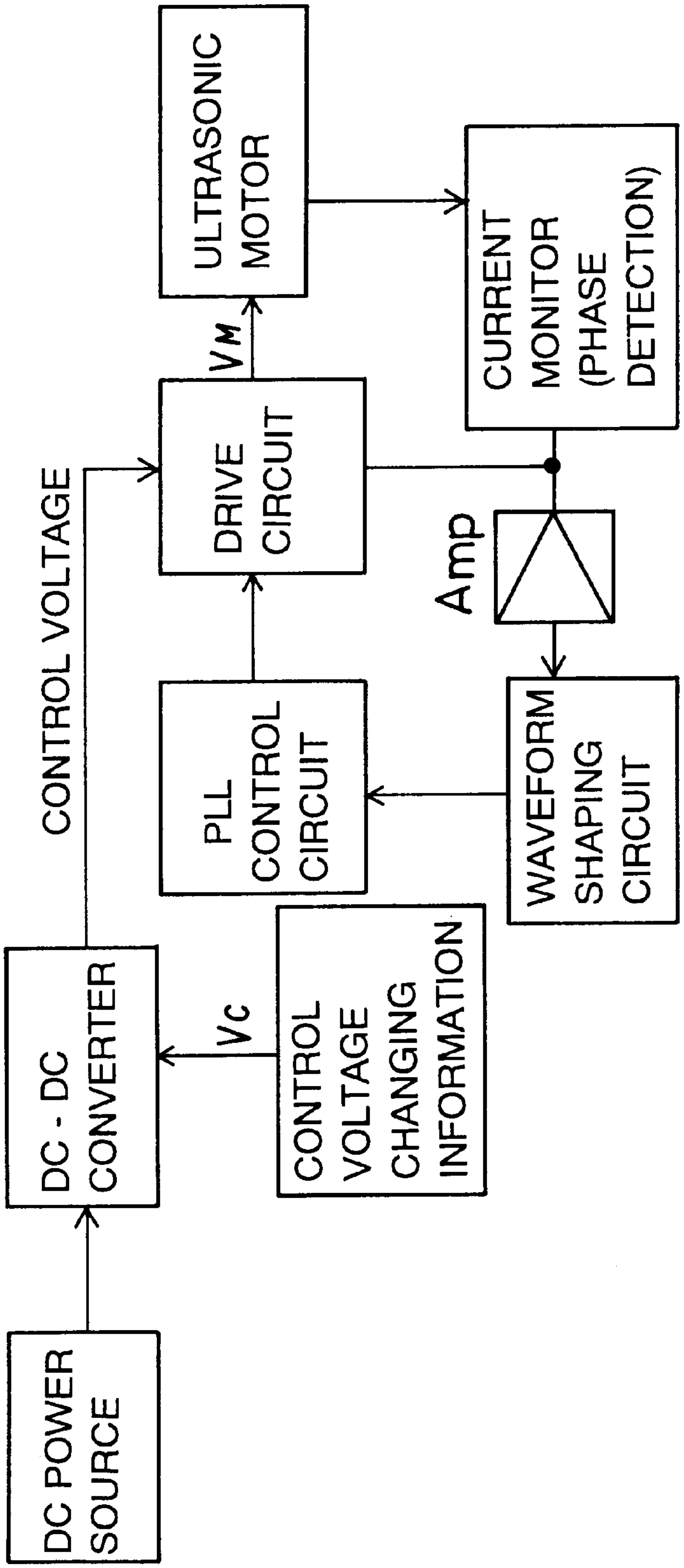
FIG. 10 is a block diagram of the conventional voltage control circuit.
Figure 11:
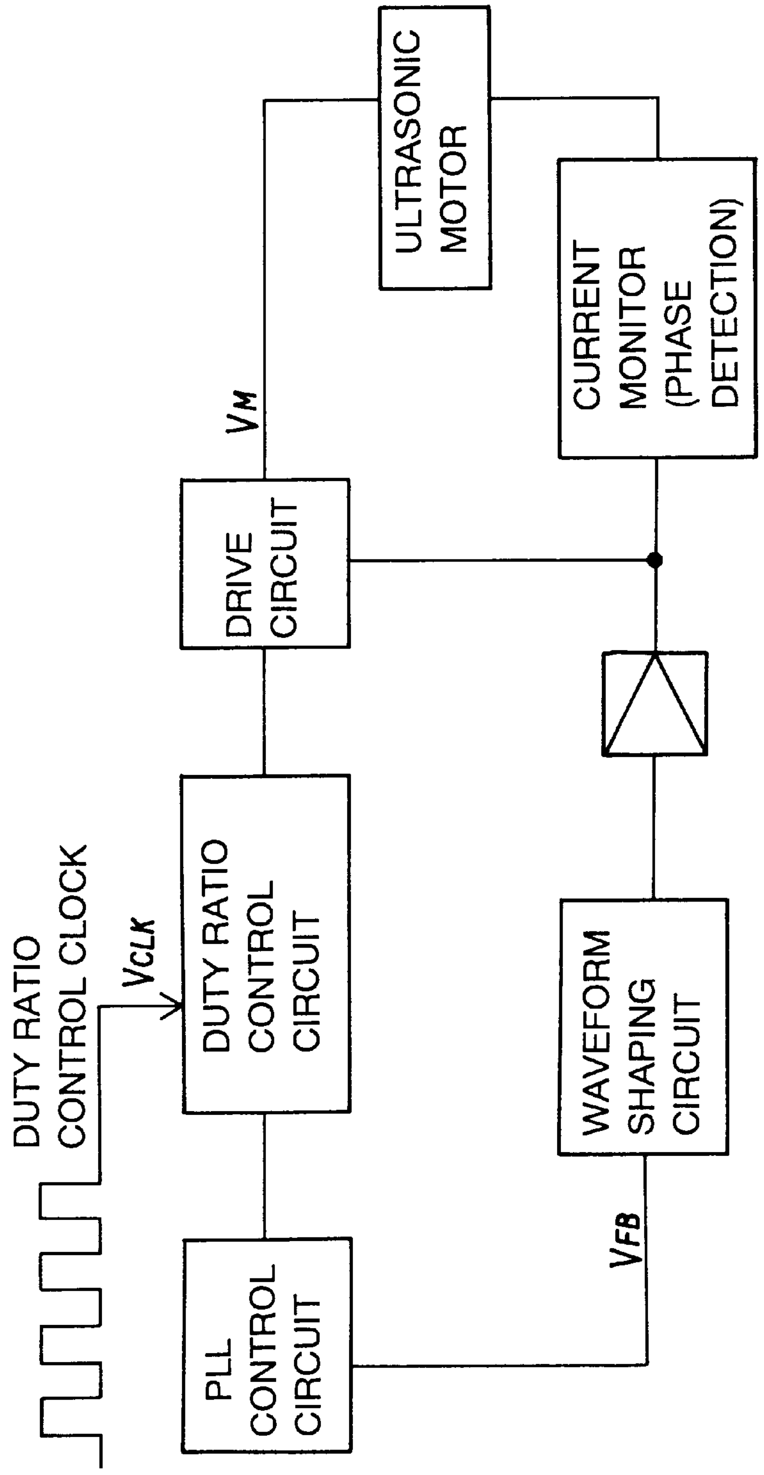
FIG. 11 is a block diagram of the conventional duty ratio control circuit.
Figure 12:
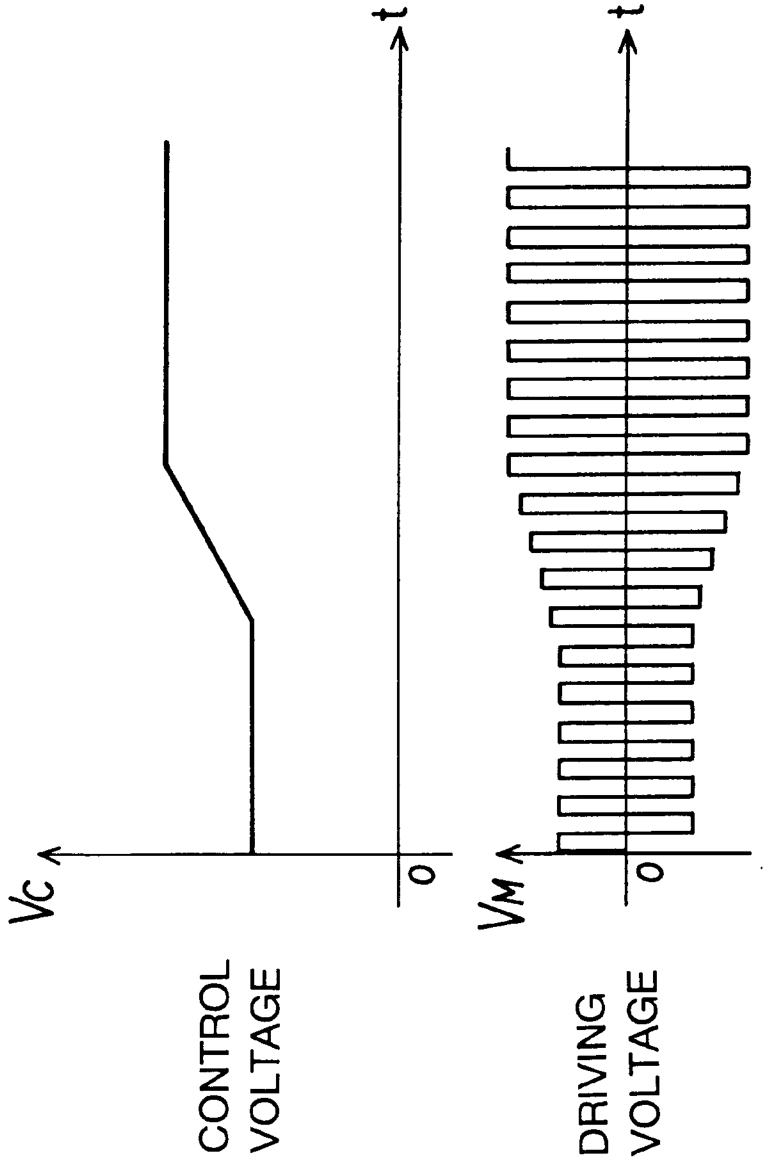
FIG. 12 is a waveform chart of control voltage and driving voltage in the conventional voltage control circuit.
Figure 13:
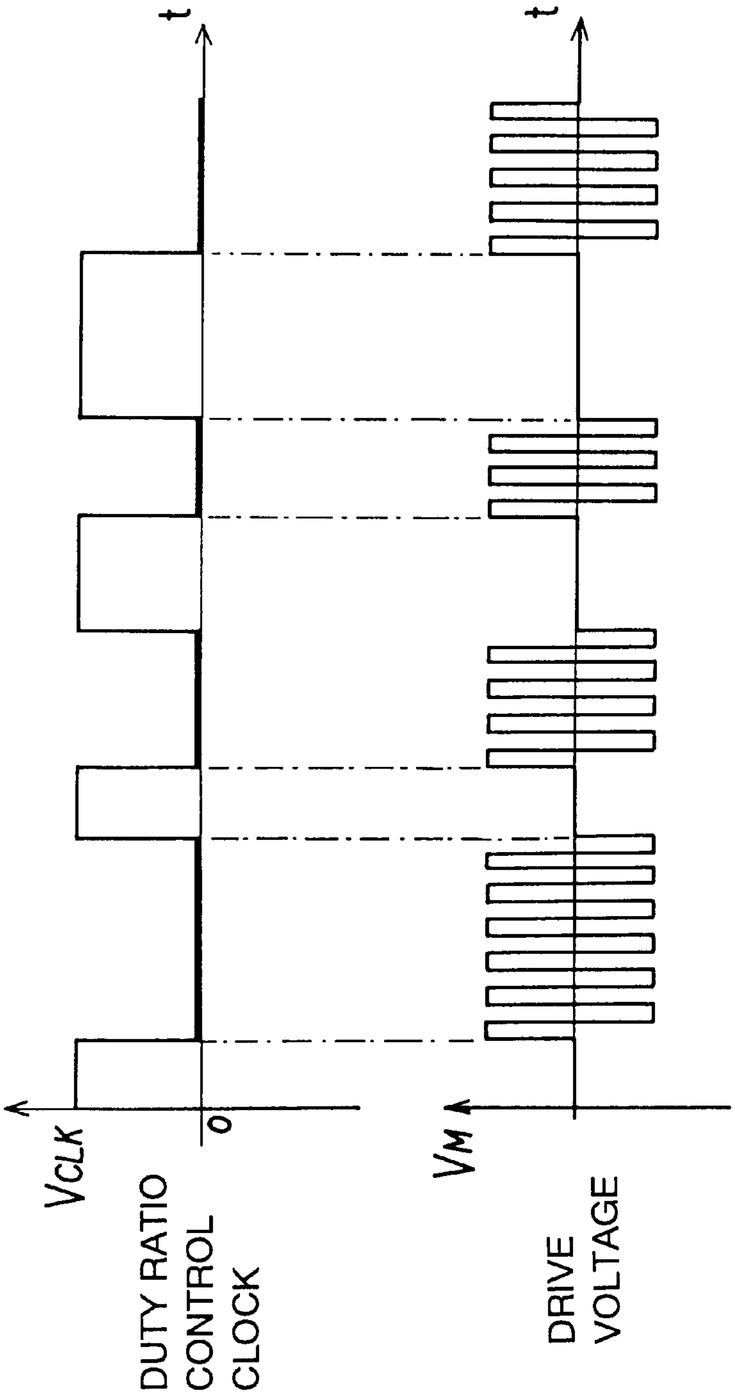
FIG. 13 is a waveform chart of duty ratio control clock and driving voltage in the conventional duty ratio control circuit.
Figures 14A, 14B, 14C:
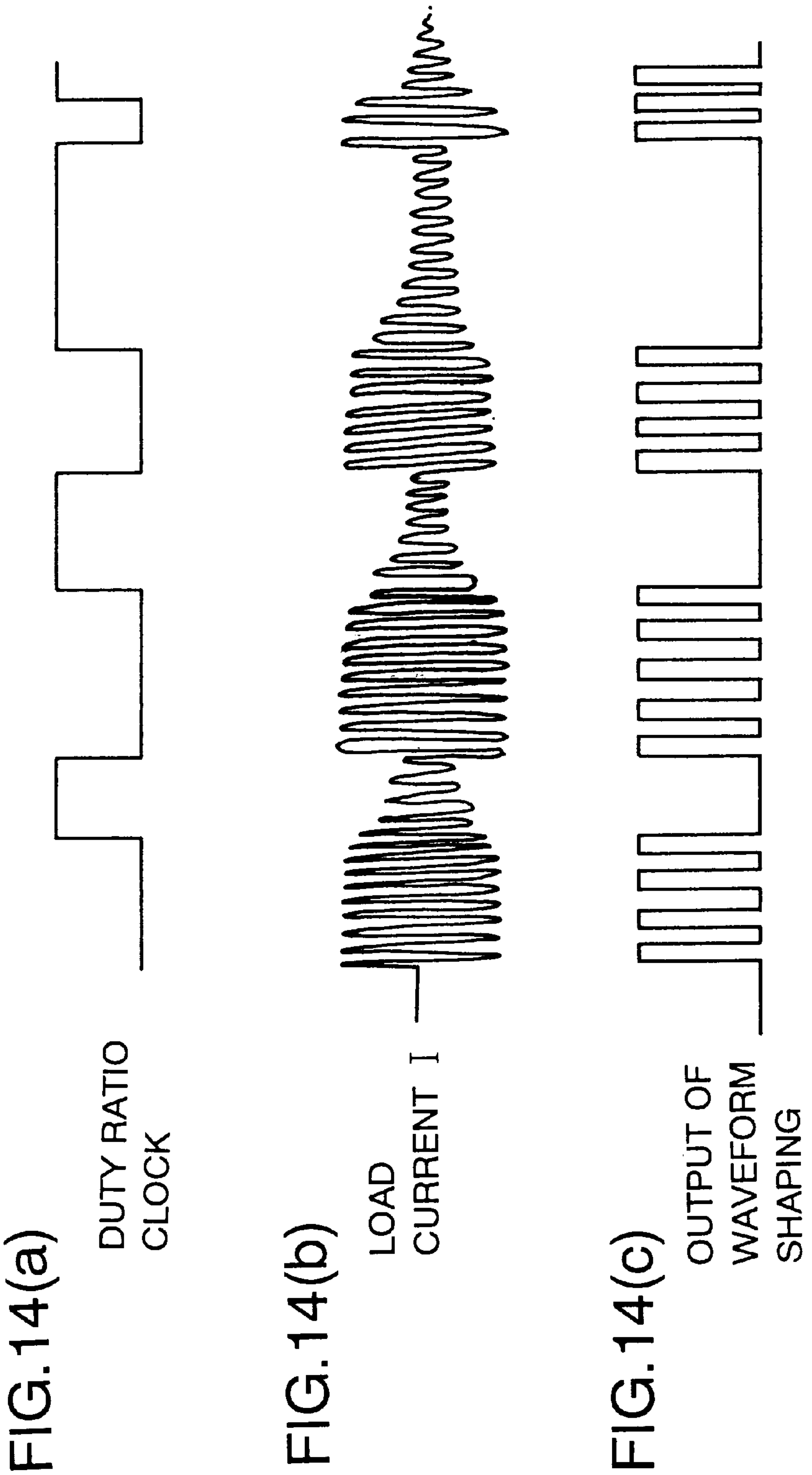
FIGS. 14*a*–14*c* are waveform charts of duty ratio clock, load current and output signal after waveform shaping in the conventional duty ratio control circuit.

One cycle of this vibration is described in detail in FIG. 9. For easy understanding of the motion of the end (the bottom end in the figure), the end is marked with a black dot at the center in FIG. 9. First at $t=0$ (FIG. 9(*a*)), the end (black dot) is bent so as to deviate to the right side. Next, after ¼ cycle at $t=\pi/2$ (FIG. 9(*b*)), the vibrator 10 shrinks and the end (black dot) deviates to the upper side. Further, at $t=\pi$ (FIG. 9(*c*)), the end (black dot) is bent so as to deviate to the left side. After the additional ¼ cycle at $t=3\pi/2$ (FIG. 9(*d*)), the vibrator 10 is extended, and the end (black dot) deviates to the lower side in the figure. Accordingly, the tracing of the black dot for one cycle shows an elliptic motion as shown in FIG. 9.

Therefore, a pipe is attached to this end and powder is fed in the pipe, then the powder is accelerated in the left direction with floating motion, and moved to the left side.

Figure 3:
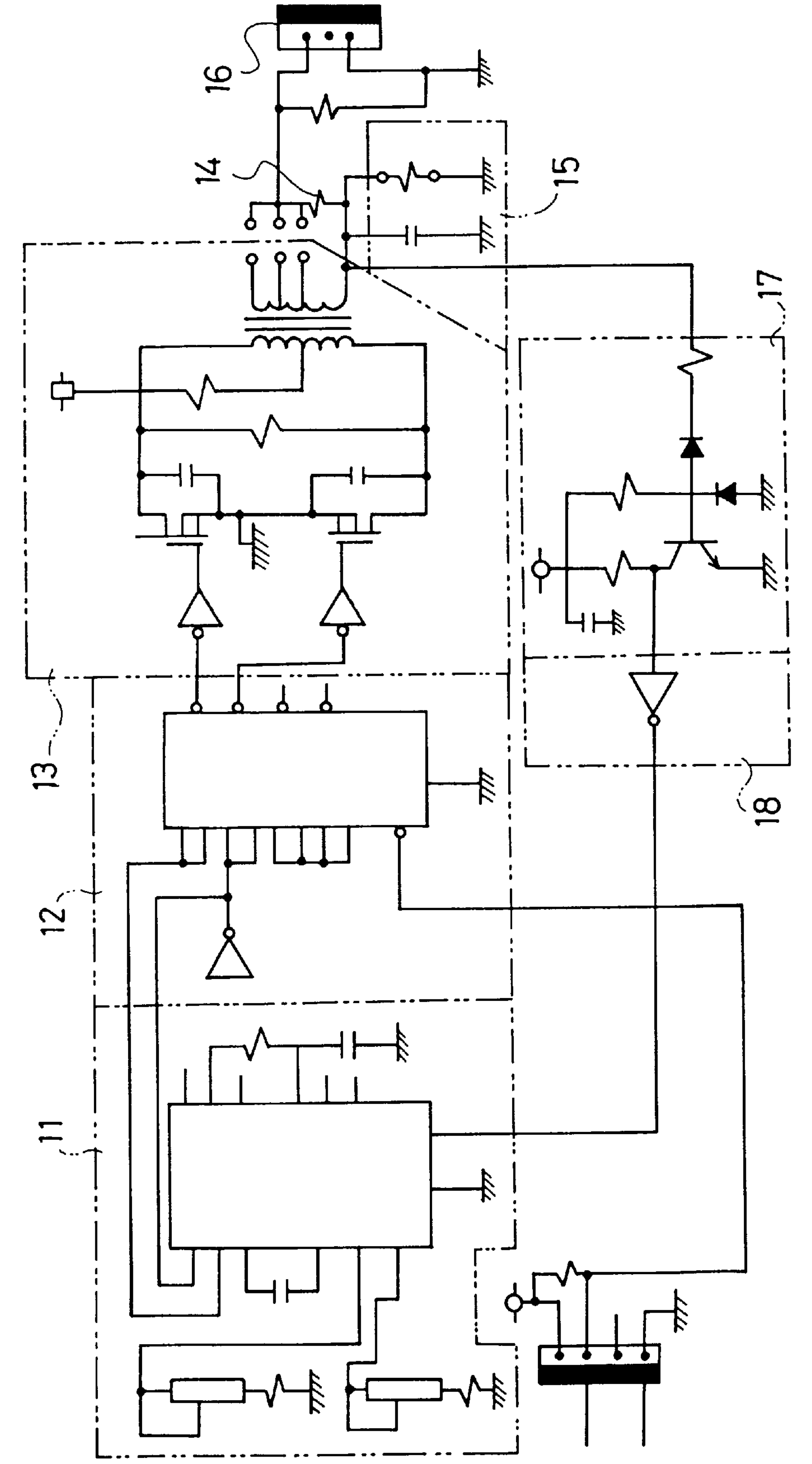
FIG. 3 is a circuit diagram of the drive apparatus.

Control circuit of the powder feeder will be described with reference to FIGS. 1, 3. FIG. 3 shows the control circuit for the powder feeder, and FIG. 1 shows the conceptual block diagram of the control circuit.

Figure 1:
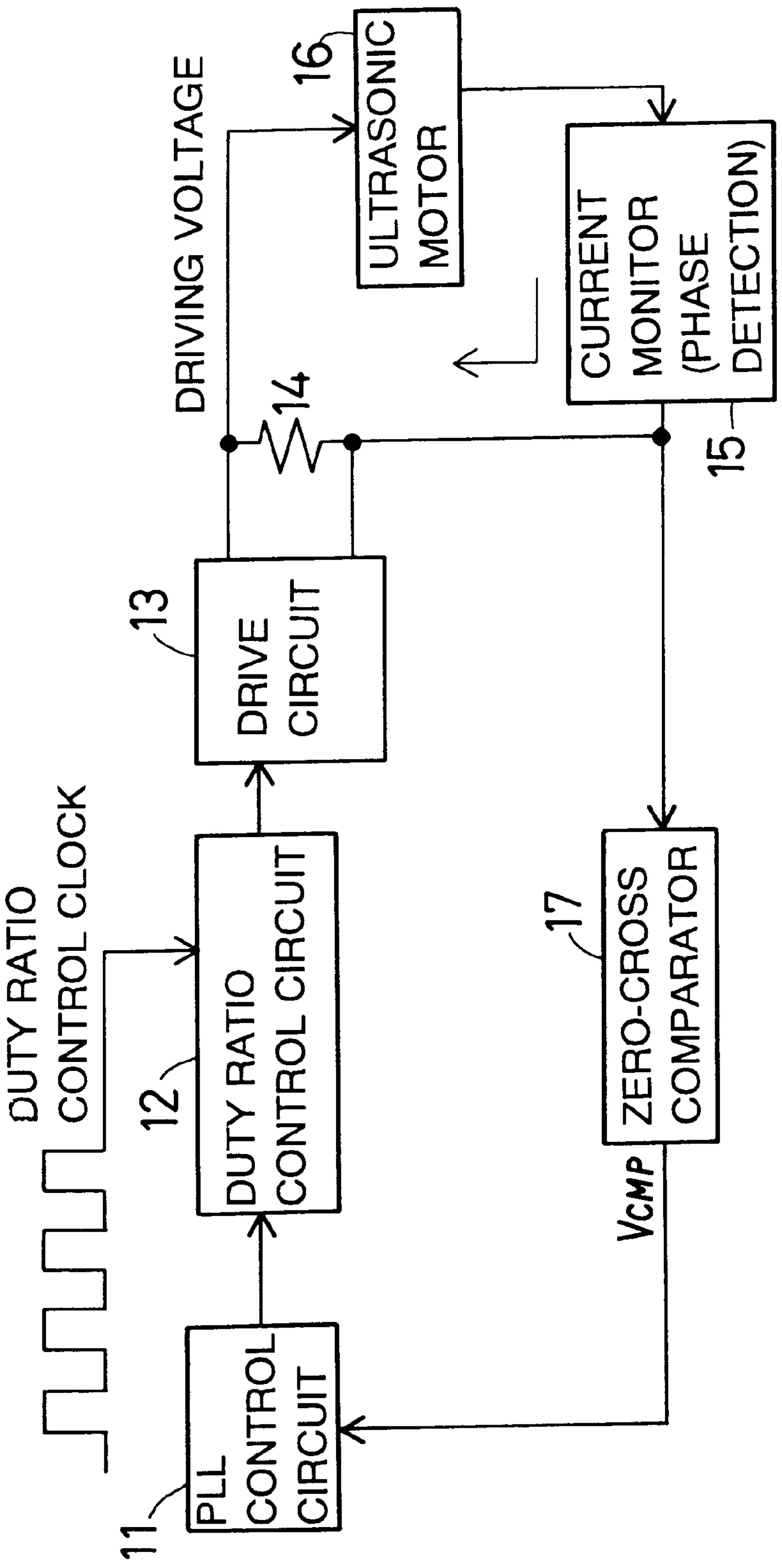
FIG. 1 is a block diagram of the drive apparatus according to the embodiment of the present invention.

As shown in FIG. 1, 3, the PLL control circuit 11 is connected to the duty ratio control circuit 12. The duty ratio control circuit 12 is connected to the drive circuit 13. The drive circuit 13 is connected to the ultrasonic motor 16. The ultrasonic motor 16 is connected to the current monitor 15. Further, the resistor 14 is serially connected to the current monitor 15. The current monitor 15 is connected to the zero-cross comparator 17 as zero-cross converting means. The zero-cross comparator 17 is connected to the PLL control circuit 11. Here, the current monitor 15, resistor 14 and the zero-cross comparator 17 constructs feedback means for feeding back residual frequency to the PLL control circuit 11, as mentioned later.

Figures 2A, 2B, 2C, 2D:
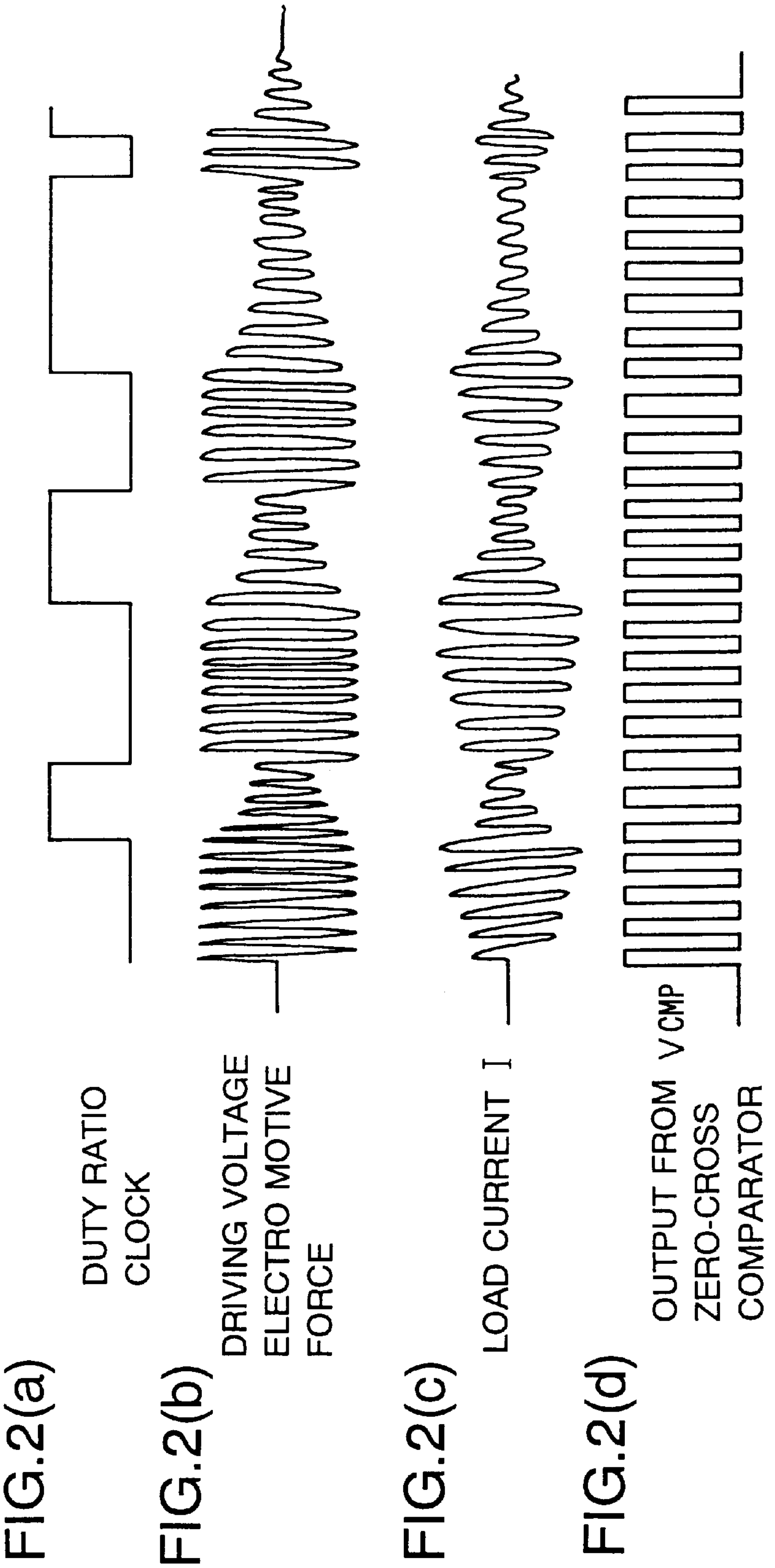
FIGS. 2*a*–2*d* are waveform charts to explain operation of the drive apparatus.

Operation of the control apparatus of the powder feeder having the control circuit constructed according to the above will be described hereinafter. The duty ratio control circuit 12 applies the alternating voltage with the resonance frequency of 29.4 kHz to the vibrator 10 of the ultrasonic motor 16, during a time according to the duty ratio, as shown in FIG. 2. As understandable from FIG. 2, the alternating voltage is applied during LOW region of the duty ratio clock, and the alternating voltage is not applied during HIGH region thereof.

Thereby, the vibrator 10 is oscillated with the resonance frequency. On the other hand, the vibrator 10 slightly oscillates on the basis of residual oscillation therein when the alternating voltage with resonance frequency is not applied.

Here, there will occur a case that the actual resonance frequency Fr' of the vibrator 10 changes to a different value from the resonance frequency Fr as shown by broken line in FIG. 7, due to outside influence such as load change occurring in the vibrator 10. To process this case, the PLL control 11 is given to the control circuit so as to automatically follow the resonance frequency Fr applied to the vibrator 10 with the actual resonance frequency Fr' of the vibrator 10.

Figure 4:
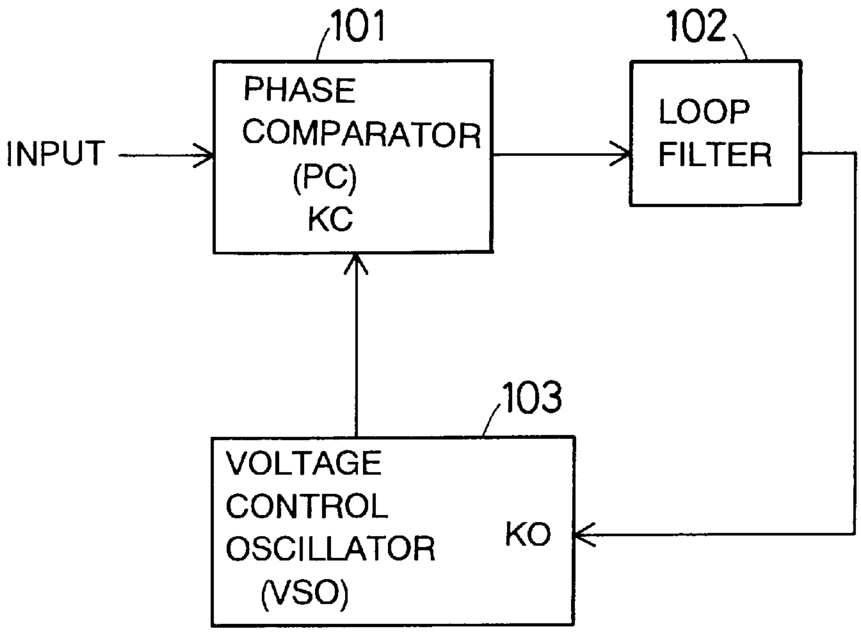
FIG. 4 is a block diagram of the PLL control circuit.

The PLL control circuit 11 has a loop circuit shown in FIG. 4, and can rapidly and correctly operate against a slight deviation between both frequencies. The PLL control circuit 11 is a feedback loop circuit to extract (demodulate) the base band signal from the modulated carrier wave, and is constructed from the phase comparator 101, the voltage control oscillator 103 and the loop filter 102, as shown in FIG. 4. In the PLL control circuit 11, phases of the modulated input signal and the output from the voltage control oscillator 103 are mutually compared in the phase comparator 101, and the frequency of the voltage control oscillator 103 is controlled on the basis of the output signal from the phase comparator 101 passed through the loop filter 102.

Figure 5:
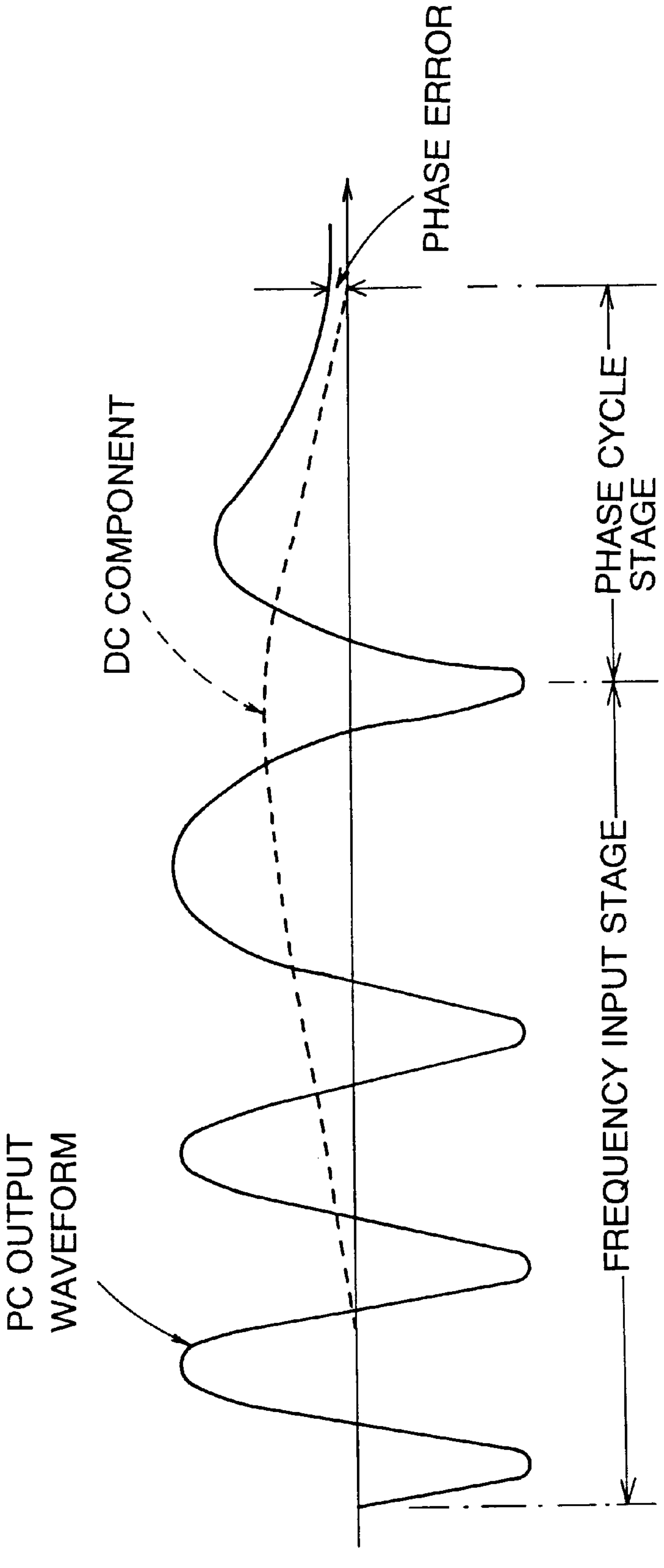
FIG. 5 is a waveform chart to explain operation of the PLL control circuit.

For example, if the frequencies of the input signal and the voltage control oscillator 103 are different, the beat signal corresponding to the frequency difference between both signals is produced from the phase comparator 101. In FIG. 5, if the output signal lies in a range of synchronism in the PLL control circuit 11, the frequency of the voltage control oscillator 103 approaches to the frequency of the input signal during the positive half-period, and contrarily goes away from it during the negative half-period. Thus, the DC component changes more slowly in the positive half-period than in the negative half-period, and the level of the DC component totally becomes positive. The voltage control oscillator 103 is controlled so that the frequency difference becomes small based on the DC voltage. The voltage control oscillator 103 completely synchronizes when the response of the PLL control circuit 11 can follow with the wave of the beat signal.

As mentioned, when the duty ratio control circuit 12 does not give the resonance frequency to the drive circuit 13, the ultrasonic motor 16 slightly oscillates on the basis of residual oscillation due to inertia force. At that time, the frequency of the residual oscillation is the same as the frequency just before voltage application from the duty ratio control circuit 12 is shut, though the amplitude is small. Based on the above residual oscillation, electromotive force produces in the vibrator 10.

Here, in the control circuit shown in FIG. 1, the resistor 14 is serially connected to the current monitor 15 so as to promote current flow produced by the electromotive force, thereby enough current flows to the current monitor 15, and at the same time, the current is converted to voltage by shifting (retarding) the phase.

The voltage picked up in the current monitor 15 is passed through the zero-cross comparator 17, the signal from the zero-cross comparator 17 as the resonance frequency information of the actual resonance frequency is fed back to the PLL control circuit 11. Thereby, the actual resonance frequency of the residual oscillation can be precisely obtained on the basis of the electromotive force, and it can obtain a signal enough for the feedback signal of the PLL control circuit 11.

Data to explain the above operation is shown in FIG. 2. In FIG. 2, FIG. 2(*a*) shows the duty ratio clock based on which the duty ratio control is conducted, FIG. 2(*b*) shows the driving voltage in the drive circuit 13 and the electromotive force produced in the ultrasonic motor 16, FIG. 2(*c*) shows the load current I detected in the current monitor 15, and FIG. 2(*d*) shows the output from the zero-cross comparator 17.

As shown in FIG. 2(*a*), 2(*b*), it is understandable that the electromotive force is produced due to the residual oscillation when the driving voltage is not applied from the duty ratio control circuit 12. The current monitor 15 detects the electromotive force as the load current I, as shown in FIG. 2(*c*). Thereafter, this signal passes through the zero-cross comparator 17, thereby the frequency information can be obtained even if the voltage of the electromotive force in the ultrasonic motor 16 is low. The frequency of the electromotive force due to the residual oscillation synchronizes with the vibrator 10, therefore the PLL control circuit 11 can be effectively operated by feeding back the frequency to the PLL control circuit 11.

As mentioned in detail, in the drive apparatus for the vibrator according to the embodiment, the drive circuit has; the duty ratio control circuit 12 which applies the alternating voltage with the resonance frequency to the vibrator 10 during a time corresponding to the duty ratio; the current monitor 15 which detects the residual frequency of the electromotive force produced due to the residual oscillation of the vibrator 10 when the alternating voltage with the resonance frequency is not applied from the duty ratio control circuit 12 and feeds back the detected residual frequency to the PLL control circuit 11 through the zero-cross comparator 17. According to the above construction, the PLL control circuit 11 can effectively operate even if the alternating voltage is not applied from the duty ratio control circuit 12, thereby the resonance frequency given to the vibrator 10 can always rapidly and correctly follow with the actual resonance frequency Fr' of the vibrator 10, when the frequency of the vibrator 10 actually changes.

Further, according to the powder feeder of the embodiment, the powder feeder has; the vibrator 10 in which the top end moves with elliptic motion when the resonance frequency Fr (29.4 Hz) is applied to the electric element 1; the pipe 20 attached to the top end of the vibrator 10 and the hopper body 30 feeding the powder P to the pipe 20; the duty ratio control circuit 12 applying the alternating voltage with the resonance frequency during a time according to the duty ratio; the PLL control circuit 11 through which the resonance frequency given to the vibrator 10 can follow with the actual resonance frequency Fr' when the resonance frequency of the vibrator 10 actually changes to the frequency Fr'; and the current monitor 15 which detects the residual frequency of the electromotive force produced due to the residual oscillation of the vibrator 10 when the alternating voltage with the resonance frequency is not applied from the duty ratio control circuit 12 and feeds back the detected residual frequency to the PLL control circuit 11 through the zero-cross comparator 17. Therefore, PLL control by the PLL control circuit 11 can be continued even if the alternating voltage is not applied to the piezoelectric element 1 by the duty ratio control circuit 12, thus feed amount of the powder P can be controlled with high accuracy.

While the invention has been particularly shown and described with reference to preferred embodiments thereof, it will be understood by those skilled in the art that the foregoing and other changes in form and details can be made therein without departing from the spirit and scope of the invention.

For example, though in the powder feeder of the embodiment the ultrasonic motor having the piezoelectric element is utilized as the drive source, the present invention can be widely applied for the apparatuses in which the vibrator is intermittently driven by the driving voltage with the resonance frequency.

For instance, the present invention can be utilized as the control method for the resonator in the fish detector or in the ultrasonic processing machine such as the ultrasonic welder used for welding or processing of plastics.

What is claimed is:

1. A drive apparatus for driving a vibrator by applying an alternating voltage with a resonance frequency to the vibrator, the drive apparatus comprising:

- Phase Lock Loop (PLL) control means for following the resonance frequency with an actual resonance frequency when the resonance frequency actually changes;
- duty ratio control means for applying the alternating voltage with the resonance frequency to the vibrator according to a duty ratio; and
- feedback means for detecting a residual frequency of an electromotive force produced due to a residual oscillation of the vibrator when the alternating voltage with the resonance frequency is not applied to the vibrator and for feeding back the detected residual frequency to the PLL control means, wherein the feedback means comprises:

- a current monitor means for detecting load current due to the electromotive force and for converting the load current into a voltage;
- a resistor to flow the load current to the current monitor means; and
- a convert means for converting the voltage into phase information and oscillating frequency information and for inputting both the phase information and the oscillating frequency information to the PLL control means.

2. The drive apparatus according to claim 1, wherein the oscillating frequency information corresponds to the actual resonance frequency.

3. The drive apparatus according to claim 1, wherein the convert means comprises a zero-cross comparator.

4. The drive apparatus according to claim 1, wherein the vibrator comprises an ultrasonic motor.

5. A powder feeder comprising:

- a vibrator having a top end which oscillates with elliptic motion when applied an alternating voltage with a resonance frequency;
- a powder feed path attached to the top end of the vibrator;
- a powder storing hopper for storing and feeding the powder to the powder feed path;
- duty ratio control means for applying the alternating voltage with the resonance frequency to the vibrator according to a duty ratio;
- Phase Lock Loop (PLL) control means for following the resonance frequency with an actual resonance frequency when the resonance frequency actually changes; and
- feedback means for detecting a residual frequency of an electro motive force produced due to a residual oscillation of the vibrator when the alternating voltage with the resonance frequency is not applied to the vibrator and for feeding back the detected residual frequency to the PLL control means.

6. The powder feeder according to claim 5, wherein the feedback means comprises:

- current monitor means for detecting load current due to the electro motive force and converting the load current into a voltage;
- a resistor to flow the load current to the current monitor means; and
- convert means for converting the voltage into phase information and oscillating frequency information and inputting both the phase information and the oscillating frequency information to the PLL control means.

7. The powder feeder according to claim 6, wherein the oscillating frequency information corresponds to the actual resonance frequency.

8. The powder feeder according to claim 6, wherein the convert means comprises a zero-cross comparator.

9. The powder feeder according to claim 5, wherein the vibrator comprises an ultrasonic motor.

10. The powder feeder according to claim 9, wherein the resonance frequency is set to approximately 29.4 kHz.

11. The powder feeder according to claim 5, wherein the powder feed path comprises a powder feed pipe formed of nylon tube.

12. A drive apparatus for driving a vibrator by applying an alternating voltage with a resonance frequency to the vibrator, the vibrator having a top end that oscillates with elliptic motion when the alternating voltage with the resonance frequency is applied, the drive apparatus comprising:

- Phase Lock Loop (PLL) control means for following the resonance frequency with an actual resonance frequency when the resonance frequency actually changes;
- duty ratio control means for applying the alternating voltage with the resonance frequency to the vibrator according to a duty ratio; and
- feedback means for detecting a residual frequency of an electromotive force produced due to a residual oscillation of the vibrator when the alternating voltage with the resonance frequency is not applied to the vibrator and for feeding back the detected residual frequency to the PLL control means.

13. The drive apparatus according to claim 12, wherein the feedback means comprises:

current monitor means for detecting load current due to the electromotive force and for converting the load current into a voltage;

a resistor to flow the load current to the current monitor means; and convert means for converting the voltage into phase information and oscillating frequency information and for inputting both the phase information and the oscillating frequency information to the PLL control means.

14. The drive apparatus according to claim 13, wherein the oscillating frequency information corresponds to the actual resonance frequency.

15. The drive apparatus according to claim 13, wherein the convert means comprises a zero-cross comparator.

16. The drive apparatus according to claim 12, wherein the vibrator comprises an ultrasonic motor.

* * * * *